United States Patent [19]

Cheung et al.

[11] Patent Number: 5,237,823
[45] Date of Patent: Aug. 24, 1993

[54] CRYOGENIC AIR SEPARATION USING RANDOM PACKING

[75] Inventors: Harry Cheung, Williamsville; Michael J. Lockett; Richard A. Victor, both of Grand Island, all of N.Y.

[73] Assignee: Praxair Technology, Inc., Danbury, Conn.

[21] Appl. No.: 861,406

[22] Filed: Mar. 31, 1992

[51] Int. Cl.$^5$ ................................. F25J 3/00
[52] U.S. Cl. .......................... 62/36; 62/22; 261/95
[58] Field of Search ............... 62/22, 24, 36; 261/94, 261/95

[56] References Cited

U.S. PATENT DOCUMENTS

| | | | |
|---|---|---|---|
| 2,055,162 | 9/1936 | Weber | 261/94 |
| 2,088,497 | 7/1937 | Tijmstra | 261/94 |
| 2,271,671 | 2/1942 | Wible | 261/94 |
| 3,595,626 | 7/1971 | Sowards | 261/94 |
| 3,959,419 | 5/1976 | Kitterman | 261/98 |
| 4,002,705 | 1/1977 | McKeown | 261/98 |
| 4,333,894 | 6/1982 | Hoppe et al. | 261/96 |
| 4,871,382 | 10/1989 | Thorogood et al. | 62/24 |
| 5,019,144 | 5/1991 | Victor et al. | 62/22 |
| 5,019,145 | 5/1991 | Rohde et al. | 62/22 |

FOREIGN PATENT DOCUMENTS 564516  5/1957 Italy.

OTHER PUBLICATIONS

Liquid Air Fractionation, J. G. Aston et al Jun. 1947 Industrial and Engineering Chemistry, p. 718.
Vacuum Tower Revamp. W. C. McClain, Jr. Sep. 1985 Chemical Processing, p. 82.

Primary Examiner—Ronald C. Capossela
Attorney, Agent, or Firm—Clyde V. Erwin, Jr.; Stanley Ktorides

[57] ABSTRACT

A cryogenic air separation system using a random packing section below a section of structured packing and redistributing liquid between sets of random and structured packing sections.

8 Claims, 2 Drawing Sheets

CRYOGENIC AIR SEPARATION USING RANDOM PACKING

TECHNICAL FIELD

This invention relates to separation of air into its components, principally nitrogen, oxygen and argon, by distillation at cryogenic temperatures, i.e. at temperatures sufficiently low for air to be in liquid form.

BACKGROUND ART

Cryogenic air separation has been the major commercial source of air components for over half a century, and those components have become increasingly important industrial products. For example, steelmaking today is dependent upon pipe-line quantities of oxygen obtained from such separation.

The separation conventionally takes place in one or more cylindrical columns containing liquid-gas contacting structures wherein a liquid flows downwardly over the structures and gaseous vapor ascends through the structures in counter-current contact with the liquid. One type of such contacting structures is referred to as packing comprising a labyrinth of surfaces over which the liquid flows as a film and sufficient void spaces for the ascending vapor to pass through easily in contact with the flowing liquid. There are two basic kinds of packing (1) regular or structured and (2) random. The former is fixed by design and typically in a honey comb-like structure made of sheet metal. Random packing is a mass of loose of material such as glass beads, ceramic rings or shaped pieces of metal that can be dumped or poured into the column.

Yet another type of liquid-gas contacting structures are called trays. A series of trays, one above another, in a column hold shallow pools of liquid through which the ascending gas is bubbled.

While packing, both structured and random, had been demonstrated as useful for cryogenic air separation and other distillation processes, it was not until the 1980's that packing, especially structured packing, became preferred contacting structures. The desirable properties of packing were known in that less power was required to compress the air being fed to the distillation column than when trays are employed. This is because a greater difference in pressure is necessary between the top and bottom of the column where the ascending gas has to be bubbled through a number of pools of liquid on trays as opposed to the passing over liquid films on the surfaces of packing. Moreover, the cost of electrical power is about one-third of the total operating cost of a cryogenic air separation plant so that even a percentage or two reduction in that power cost is significant.

Despite the known operating cost savings of using structured packing, such savings were offset by the additional capital cost of the packing. Also, tray design had been highly developed to give precise and predictable results. Circumstances changed, however, in the 1970's and early 1980's. The cost of generating electricity increased dramatically in part because of actions by the OPEC cartel and to a lesser extent as a result of environmental cost burdens. At the same time (perhaps stimulated by the increased cost of electricity) more efficient and less costly structured packing was developed and used commercially in the petrochemical and petroleum refining industry where the vast majority of distillation equipment is employed. Commercial use in cryogenic air separation followed.

Notwithstanding the improvements in structured packing, it remains more expensive as a capital item than trays. Random packing, on the other hand, is cheaper than structured packing and will operate at lower pressure drop than trays like structured packing, but it has serious performance deficiencies for air separation. The primary deficiency is lack of uniform flow of the descending liquid over the entire cross section of the column when a section or bed of random packing has a depth that is normal for air separation. This is a problem since an economically viable air separation system requires precise operational control in order to make a nearly complete separation of oxygen, nitrogen and argon because their boiling points are within a relatively narrow range ($-360°$ F., $-383°$ F. and $-368°$ F. respectively at normal atmospheric pressure).

Therefore, it is an object of this invention to provide a method of cryogenic air separation employing random packing as liquid-gas contacting structures.

Another object of the invention is to provide a distillation column for cryogenic air separation containing alternate sections of random and structured packing.

SUMMARY OF THE INVENTION

The above and other objects are attained by:

A distillation column for cryogenic air separation comprising at least one set of adjacent liquid-gas contacting sections wherein the upper section of the set contains structured packing and the lower section contains random packing.

A method of cryogenic air separation comprising contacting a descending liquid component of air with an ascending gaseous component of air in column having an upper section of structured packing and an adjacent lower section of random packing.

The term, "column", as used herein means a distillation or fractionation column or zone, i.e., a contacting column or zone wherein liquid and vapor phases are countercurrently contacted to effect separation of a fluid mixture, as for example, by contacting of the vapor and liquid phases on a series of vertically spaced trays or plates mounted within the column or alternatively, on packing elements with which the column is filled. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith, et al., page 13-3. *The Continuous Distillation Process.* The term, double column is used herein to mean a higher pressure column having its upper end in heat exchange relation with the lower end of a lower pressure column. A further discussion of double columns appears in Ruheman "The Separation of Gases" Oxford University Press, 1949, Chapter VII, Commercial Air Separation.

As used herein, the term "argon column" means a column wherein upflowing vapor becomes progressively enriched in argon by countercurrent flow against descending liquid and an argon product is withdrawn from the column.

The term "indirect heat exchange", as used herein means the bringing of two fluid streams into heat exchange relation without any physical contact or intermixing of the fluids with each other.

As used herein, the term "vapor-liquid contacting elements" means any devices used as column internals to facilitate mass transfer, or component separation, at the liquid vapor interface during countercurrent flow of the two phases.

As used herein, the term "tray" means a substantially flat plate with openings and liquid inlet and outlet so that liquid can flow across the plate as vapor rises through the openings to allow mass transfer between the two phases.

As used herein, the term "packing" means any solid or hollow body of predetermined configuration, size, and shape used as column internals to provide surface area for the liquid to allow mass transfer at the liquid-vapor interface during countercurrent flow of the two phases.

As used herein, the term "random packing" means packing wherein individual members do not have any particular orientation relative to each other or to the column axis.

As used herein, the term "structured packing" means packing wherein individual members have specific orientation relative to each other and to the column axis.

As used herein the term "theoretical stage" means the ideal contact between upwardly flowing vapor and downwardly flowing liquid into a stage so that the exiting flows are in equilibrium.

DETAILED DESCRIPTION

Figure 1:
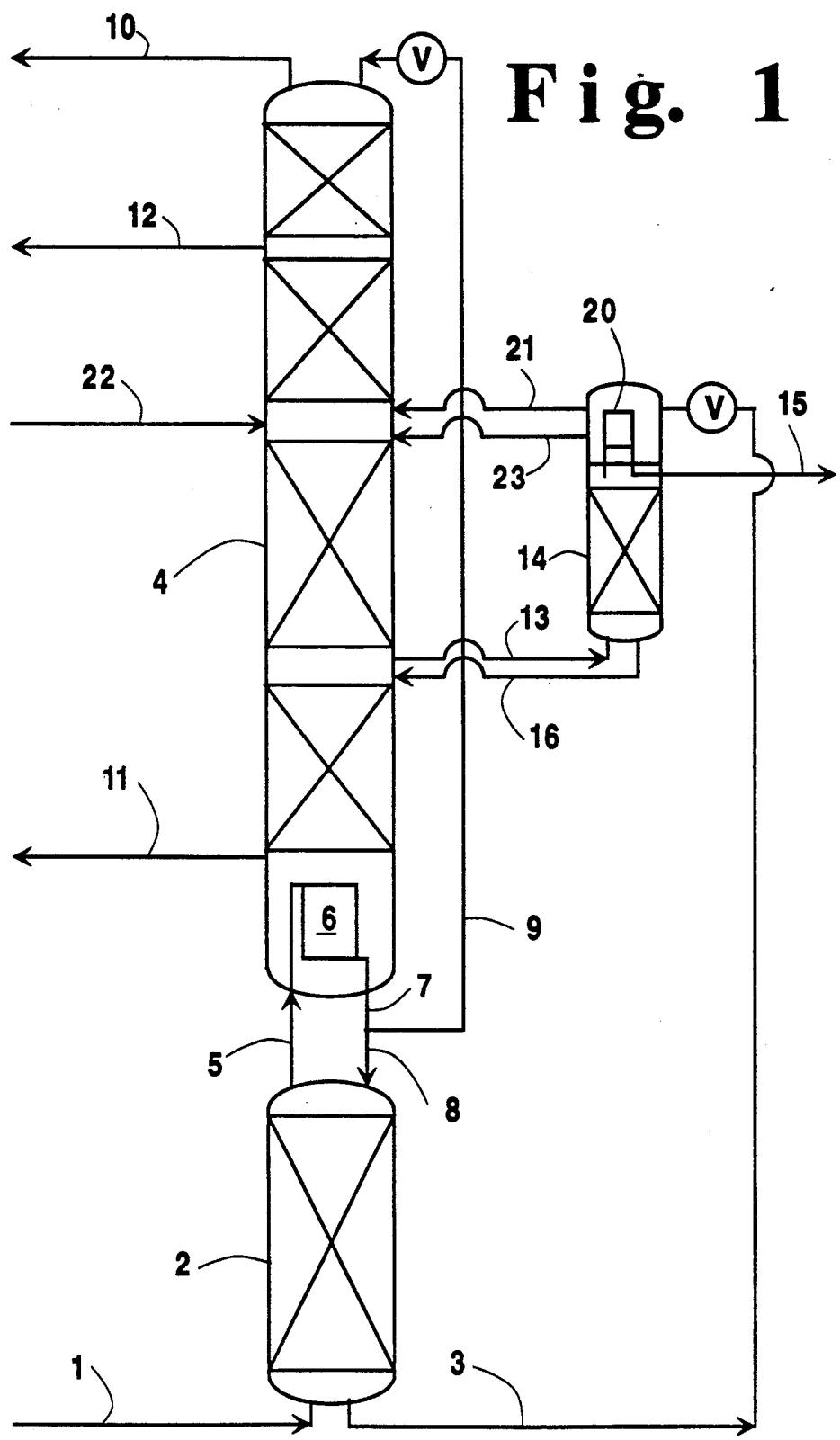
FIG. 1 is a simplified schematic representation of a typical air separation plant in which this invention may be practiced comprising a conventional double column arrangement having a lower pressure column in heat exchange relationship with a higher pressure column and also having an argon or side-arm column.

The process and apparatus of this invention will be described in detail with reference to FIGS. 1 through 3:

Referring to FIG. 1, higher pressure feed air 1 is introduced into column 2 which is the higher pressure column of a double column system. Within column 2 the feed air is separated by cryogenic distillation into a nitrogen-enriched vapor and an oxygen-enriched liquid. Oxygen-enriched liquid 3 is passed from column 2 into argon column top condenser 20 wherein it is at least partially vaporized against condensing argon column top vapor, and then passed as vapor stream 21 and liquid stream 23 into column 4 which is the lower pressure column of the double column system. Nitrogen-enriched vapor 5 is passed into condenser 6 wherein it is condensed by heat exchange with boiling column 4 bottoms. Resulting nitrogen-enriched liquid 7 is passed in part 8 into column 2 as liquid reflux and in part 9 into column 4 as liquid reflux. Lower pressure feed air 22 may also be introduced into column 4. Within column 4 the feeds are separated by cryogenic distillation into nitrogen-rich and oxygen-rich portions.

Nitrogen-rich portion is removed from column 4 as stream 10 and is recovered as product nitrogen. Oxygen-rich portion is removed from column 4 as stream 11 and is recovered as product oxygen. A waste stream 12 is removed from column 4 for control purposes. A stream 13 comprising primarily oxygen and argon is taken from column 4 at an intermediate point of the column and passed into argon column 14 wherein it is separated by cryogenic distillation into an argon-rich part and an oxygen-rich part. Argon-rich vapor is condensed in argon column top condenser 20 and a portion is removed from column 14 as stream 15 and is recovered as product crude argon. Oxygen-rich part is removed from column 14 and is returned as stream 16 to column 4.

Figure 2:
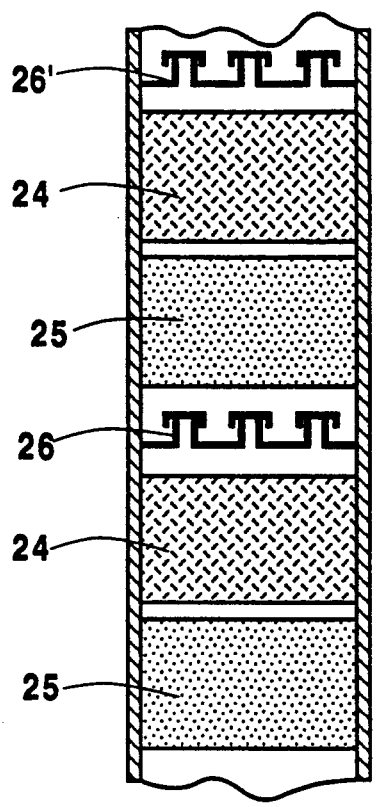
FIG. 2 illustrates in cross section the invention as it may be employed as the liquid vapor contacting structures of a crude argon column such as that shown schematically as column 14 in FIG. 1.

In FIG. 2, a part of a column is shown employing a section of structured packing 24 and just below it a section of random packing 25, and a liquid distributor (or re-distributor) 26 between another set of structured and random packing sections, 24 and 25 respectively. Another liquid distributor 26' is used immediately above the two sets of structured and random packing sections. This sequential arrangement of packing sections permits the use of a substantial amount of random packing in a mass/heat transfer system especially for distillation or rectification in cryogenic air separation. Overall efficiency and performance of the system is substantially the same as when all structured packing is used, but there is a significant saving in capital costs because random packing is cheaper per se and cheaper to install than structured packing.

A less desirable alternative to what is shown in FIG. 2 would be to use random packing sections in place of the two structured packing sections 25, and use two additional liquid distributors so that there is a liquid distributor between each section of packing, i.e. a series of relatively short sections of random packing with a liquid distributor between each section.

It is preferred to use the invention in argon columns which have smaller diameters than those of the double columns in a typical plant such as represented in FIG. 1. Smaller diameters are preferred because when sections of random packing are scaled up by increasing diameter, there is generally a greater loss in performance than with structured packing. By way of example, we have established that in columns about three feet in diameter about 15 theoretical stages of random packing can be used without significant non-uniform liquid distribution. Fewer than about 15 theoretical stages may be all that is practical for random packing in air separation columns much greater than three feet in diameter. Consequently, FIG. 2 illustrates the invention used as the liquid-vapor contacting system in a typical crude argon column (such as column 14 in FIG. 1) with about 50 theoretical stages.

If the two sections of random packing 25 each have 15 theoretical stages, more than half of the distillation, 30 of 50 theoretical stages, can be accomplished with random packing. This represents a substantial saving in capital costs for an argon column. Of course, since a low pressure drop is inherent in the combination of structured and random packing of this invention (from about 0.01 to about 0.02 psia per theoretical stage compared to about 0.07 to 0.08 per theoretical stage for trays), operating costs are the same as using all structured packing. Furthermore, as with the low pressure drop in using structured packing, more than 50 theoretical stages can be employed to either (1) recover more argon or (2) obtain argon of a higher purity.

This invention is not limited to any specific type of structured packing, but it is preferred to use that type described in U.S. Pat. No. 4,296,050 to Meir. Similarly, the invention is not limited to any particular kind of random packing. Useful types include Pall rings, Interlox rings, Nutter rings and Raschig rings having a size less than about 1½ inches and preferably from about ¼ to 1 inch. A surface area to volume density of the random packing of about 150 to 50 ft $^2$/ft$^3$ is preferred. Void volume space in the packing of about 90% to 98% is also preferred. A commercially available packing which meets these criteria, and preferred by us is the ⅝ inch size of Nutter rings.

Figure 3:
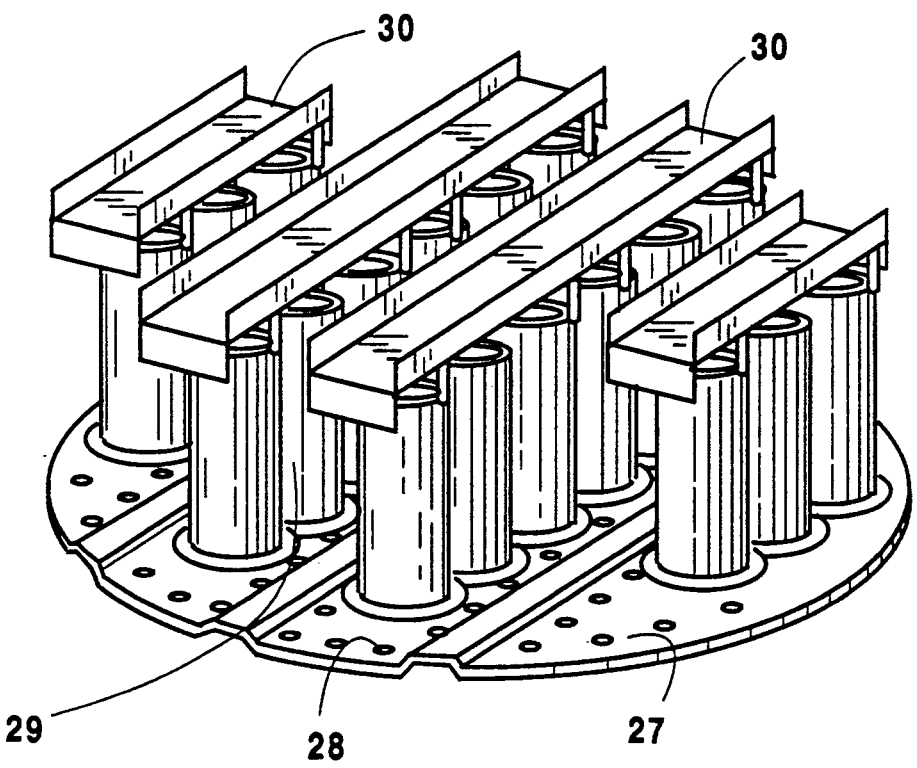
FIG. 3 is a three-dimensional drawing of the liquid distributors 26 and 26' shown in FIG. 2.

FIG. 3 shows a typical orifice plate distributor useful with this invention. Orifice plate 27 has at least six orifices, 28, per square foot of column flow area, and preferably at least nine per square foot. Gas chimneys 29 provide gas upflow passages which together are about 10 ercent of the column cross-sectional area. Liquid drip guard 30 is used to prevent liquid bypassing. The column top liquid distributor 26' in FIG. 2 may not need a liquid drip guard. The orifice plate 27 should be substantially level.

It will be understood by those skilled in the art to which this invention pertains that there are other embodiments of the invention not described above that are within the scope of the appended claims.

We claim:

1. A method of cryogenic separation of at least two components of air with different volatilities comprising feeding a mixture of said components cooled to at or near the boiling point of said mixture to one or more points in a rectification column having at least one section of random packing adjacent and below a section of structured packing wherein there is a liquid mixture of said components descending through said adjacent packing sections in counter-current mass transfer contact with an ascending vapor mixture of said components, and removing a portion of the liquid and/or vapor mixture from said column as product.

2. The method of claim 1 wherein the feed mixture is a vapor containing argon and the product is a mixture containing argon in greater concentration than in the feed mixture.

3. The method of claim 2 wherein the mass transfer takes place in at least two sets of random and structured packing and the descending liquid mixture is laterally distributed between said sets of packing sections.

4. A mass/heat transfer column for oxygenic air separation comprising means for feeding a mixture of at least two components of air to the column at one or more points therein including means to cool said mixture to at or near its boiling point; at least one set of two adjacent rectification sections within the column, the lower section of the set containing random packing and the upper section containing structured packing whereby mass/heat transfer can occur within the set between a descending liquid mixture of said components of air and an ascending vapor mixture of said components; means to remove a portion of the liquid and/or vapor mixture from said column as product and heat exchange means to effect a product of greater concentration of one air component than in the feed mixture.

5. The mass/heat transfer column of claim 4 wherein said column is an argon column, the feeding means is a line for feeding a vapor mixture containing argon as one air component to below a set of said packing sections and said means to remove product containing a higher concentration of argon than the vapor feed mixture is an exit line above a set of said packing sections.

6. The argon column of claim 5 wherein there are at least two sets of random and structured packing sections separated by a liquid redistribution means.

7. The argon column of claim 5 wherein the liquid redistribution means has an orifice plate with at least six orifices per square foot of column flow area.

8. The argon column of claim 5 wherein the set of adjacent packing sections has a diameter of less than about three feet.

* * * * *

UNITED STATES PATENT AND TRADEMARK OFFICE
CERTIFICATE OF CORRECTION

PATENT NO. : 5,237,823
DATED : August 24, 1993
INVENTOR(S) : Harry Cheung et al.

It is certified that error appears in the above-indentified patent and that said Letters Patent is hereby corrected as shown below:

In column 1, line 32 between "loose" and "material" delete "of."

In column 2, line 35, between "in" and "column" insert -- a --.

In column 5, line 14 delete "ercent" and insert therefor -- percent --.

In column 6, line 7, claim 4, delete "oxygenic" and insert therefor -- cryogenic --.

Signed and Sealed this

Seventh Day of February, 1995

Attest:

BRUCE LEHMAN

*Attesting Officer*  *Commissioner of Patents and Trademarks*